United States Patent
Roman et al.

(10) Patent No.: US 9,599,221 B2
(45) Date of Patent: Mar. 21, 2017

(54) CONNECTING ROD/PISTON ARRANGEMENT FOR ALTERNATIVE COMPRESSOR AND PROCESS FOR ASSEMBLING CONNECTING ROD/PISTON ARRANGEMENT FOR ALTERNATIVE COMPRESSOR

(75) Inventors: Alisson Luiz Roman, Joinville (BR); Celso Kenzo Takemori, Joinville (BR); Paulo Rogerio Carrara Couto, Joinville (BR); Wilfred Roettger, Joinville (BR)

(73) Assignee: Whirlpool S.A., São Paulo, SP (BR)

( * ) Notice: Subject to any disclaimer, the term of this patent is extended or adjusted under 35 U.S.C. 154(b) by 398 days.

(21) Appl. No.: 14/127,746

(22) PCT Filed: Jun. 21, 2012

(86) PCT No.: PCT/BR2012/000213
§ 371 (c)(1),
(2), (4) Date: Jul. 17, 2014

(87) PCT Pub. No.: WO2012/174627
PCT Pub. Date: Dec. 27, 2012

(65) Prior Publication Data
US 2015/0040752 A1  Feb. 12, 2015

(30) Foreign Application Priority Data
Jun. 22, 2011 (BR) ..................................... 1102707

(51) Int. Cl.
*F16J 7/00* (2006.01)
*F16J 1/12* (2006.01)
(Continued)

(52) U.S. Cl.
CPC ............. *F16J 1/12* (2013.01); *F04B 39/0022* (2013.01); *F04B 39/14* (2013.01); *F04B 53/147* (2013.01); *F16J 7/00* (2013.01); *Y10T 29/49274* (2015.01)

(58) Field of Classification Search
CPC .. F16J 1/12; F16J 7/00; F04B 39/0022; F04B 53/147
See application file for complete search history.

(56) References Cited

U.S. PATENT DOCUMENTS 1,806,078 A * 5/1931 Miller ................... F04B 53/143
92/206
3,191,264 A   6/1965 Underwood

FOREIGN PATENT DOCUMENTS

BE          782267 A1    10/1972
CN         2224301 Y     4/1996
(Continued)

OTHER PUBLICATIONS

International Search Report and Written Opinion issued on Feb. 18, 2013 in counterpart International Application No. PCT/BR2012/000213.

*Primary Examiner* — Michael Leslie
(74) *Attorney, Agent, or Firm* — Brian J. Colandreo; Michael T. Abramson; Holland & Knight LLP

(57) ABSTRACT

The present invention refers to a connecting rod/piston arrangement for alternative compressor, comprising using at least an intermediate element capable of associating said connecting rod with the piston, wherein both do not radially contact with one another. A process for assembling said connecting rod/piston arrangement for alternative compressor is also disclosed. The connecting rod/piston arrangement for alternative compressor comprises at least a piston (1), at least an intermediate element (2) and at least a connecting rod (3), wherein said piston (1) comprises at least a non- (Continued)

through axial channel (11); said intermediate element (2) comprises at least a through axial channel (21); and said connecting rod (3) comprises at least a connection end (31). In this regard, the intermediate element (2) is securely housed inside the non-through axial channel (11) of piston (1); and said connection end (31) of connecting rod (3) is securely housed inside the through axial channel (21) of intermediate element (2).

16 Claims, 1 Drawing Sheet

(51) Int. Cl.
*F04B 39/00* (2006.01)
*F04B 39/14* (2006.01)
*F04B 53/14* (2006.01)

(56) References Cited

FOREIGN PATENT DOCUMENTS

| | | |
|---|---|---|
| CN | 101523050 A1 | 9/2009 |
| DE | 3305647 A1 | 8/1984 |
| EP | 0610708 A1 | 1/1994 |
| JP | H0771368 A1 | 3/1995 |
| JP | 2001280239 A1 | 10/2001 |
| JP | 2002295368 A1 | 10/2002 |

* cited by examiner

CONNECTING ROD/PISTON ARRANGEMENT FOR ALTERNATIVE COMPRESSOR AND PROCESS FOR ASSEMBLING CONNECTING ROD/PISTON ARRANGEMENT FOR ALTERNATIVE COMPRESSOR

RELATED APPLICATIONS

The subject application is a U.S. National Stage Application of International Application No. PCT/BR2012/000213, filed on 21 Jun. 2012, which claims the priority of Brazil Patent Application No.: PI1102707-0, filed on 22 Jun. 2011, the contents of which are herein incorporated by reference in its entirety.

FIELD OF THE INVENTION

The present invention refers to a connecting rod/piston arrangement for alternative compressor, more specifically, a linear compressor applied to cooling systems and the like. The now disclosed connecting rod/piston provides for the use of at least an intermediate element capable of associating said connecting rod with the piston, wherein both do not radially contact with one another.

The present invention also refers to a process for assembling said connecting rod/piston arrangement for alternative compressor.

BACKGROUND OF THE INVENTION

Those skilled in the art know that an alternative compressor comprises means to move at least a movable assembly, wherein at least a piston is capable of being reciprocating displaced in the axial direction inside a cylinder in order to effect compression on working fluid.

The present state of the art comprises some models of alternative compressor assembly, such as, for example, linear compressor.

A linear compressor has its movable assembly driven by a linear-type electric engine, wherein a portion of said engine is static (normally secured to a compressor cylinder) and at least a portion is dynamic (normally capable of linear movement and coupled to said movable assembly of the compressor). In this context, the movable assembly of the compressor follows an axial and reciprocating displacement of the dynamic portion of the engine to cause compression on a working fluid.

According to the present state of the art, a movable assembly of alternative compressor comprises at least a piston and a connecting road, which includes a body responsible for connection between said engine and piston. Constructions are known where one of the connecting road ends is directly associated with the shaft/dynamic portion of the engine (the other end being associated with the piston). Constructions where one of the connecting rod ends is associated with a series of additional elements which are in turn associated with the shaft/dynamic portion of the engine (the other end being associated with the piston) are also known.

With regard to association of one of the connecting rod ends with the piston, also known are several constructions wherein the simplest construction comprises a direct fixation between a connecting rod and a piston.

The present state of the art also provides for intermediate elements used between an association of a connecting rod and a piston.

An example of using intermediate elements for association of a connecting rod with a piston is described in U.S. Pat. No. 3,263,311. Said US Patent describes an association between a piston in a connecting rod wherein said piston is essentially hollow and receives in its interior a connection insertion which in turn receives a connecting rod end. Said connection insertion is fixed inside the piston through a stop also previously formed inside the piston.

The large drawback of this example of construction resides in the fact that the connection insertion is fixed inside the piston through inner stops (inner grooves) physically existing in the piston itself. That is, in addition to the fact that said stops do not comprise an efficient fixation means, they also cause an increase in the piston manufacture complexity and costs.

Another example of a similar construction is disclosed in U.S. Pat. No. 3,473,444, which refers to a connecting rod/piston arrangement consisting of a hollow piston and a connecting rod having a swivel end. In this case, the piston comprises a contacting insertion housed in its interior, said insertion being formed by two different parts which are assembled under especial processing conditions. Said insertion is especially suitable for receiving swivel end of the connecting rod.

The large drawback relative to this constructional example resides in the fact that said insertion, assembled inside the piston, fulfills all the internal volume thereof, wherein reduction in the piston mass is not possible. Moreover, said insertion is securely associated only with the piston interior while said connecting rod comprises several degrees of freedom of movement when coupling to the insertion. This is not suitable for some specific applications.

Another example of similar construction is described in U.S. Pat. No. 4,831,916, which refers, among other elements, to a rigid piston comprising a connection opening and an insertion member housed in said connection opening of the piston. In this case, a connecting road functionally connected to said insertion member, and, therefore, associated with the piston is disclosed. Said connecting rod is kept inside the insertion member through resilient portions disposed at the insertion member itself.

A large drawback concerning this example of construction resides in the fact that said insertion, in addition to being secured to the piston end (being capable of being moved away) fixes said connecting through resilient portions, which may undergo deformation and break In view of the foregoing, it can be obviously observed that there is a need for developing a solution free of the disadvantageous aspects mentioned above.

OBJECTS OF THE INVENTION

By this way, one object of the present invention is to provide a new connecting rod/piston arrangement for alternative compressor, which allows for the control (and reduction) of piston mass.

Another object of the present invention is to provide a connecting rod/piston arrangement for alternative compressor, which uses an intermediate element which is capable of associating the connecting rod with the piston, wherein both do not radially contact with one another. A further object of the present invention is that said contacting rod and the insertion, as well as the connecting rod and the insertion, are securely associated such that they cannot move angularly.

Additionally, an object of the present invention is to provide a simple and effective process for assembling a connecting rod/piston arrangement for alternative compressor.

SUMMARY OF THE INVENTION

These and other objects of the present invention are fully accomplished by means of a connecting rod/piston arrangement for alternative compressor, as now proposed.

Said connecting rod/piston arrangement for alternative compressor comprises at least a piston, at least an intermediate element and at least a connecting rod. According to the concept of the present invention, said piston comprises at least a non-through axial channel, said intermediate element comprises at least a through axial channel, and said connecting rod comprises at least a connecting end. In addition, the intermediate element is securely housed inside the non-through axial channel of the piston, and the connecting rod end is securely housed inside the through axial channel of said intermediate element.

Preferably, said non-through axial channel of the piston is cylindrical. Further preferably, said intermediate element is cylindrical. In this aspect, it is observed that inner diameter of non-through axial channel of the piston is analogous to outer diameter of the intermediate element.

Preferably, said through axial channel of the intermediate element is cylindrical. Further preferably, the connection end of the connecting rod is cylindrical. In this regard, it is observed that inner diameter of the through axial channel of the intermediate element is analogous to outer diameter of the connection end of the connecting rod.

In accordance with the concept of the present invention, said intermediate element is securely housed in the closed end of the non-through axial channel of the piston, wherein same has radial and axial physical contact with the inner face of the non-through channel of the piston.

Further, in accordance with the concept of the present invention, the connection end of the connecting rod has radial physical contract with the inner face of the through axial channel of the intermediate element, and axial physical contact with the inner face of the non-through axial channel of the piston.

Preferably, the connecting rod/piston arrangement for alternative compressor of the present invention comprises a binder disposed between the outer face of the intermediate element and the inner face of the intermediate element of the non-through axial channel of the piston, and a binder disposed between the end of the connection end of the connecting rod and the inner face of the through axial channel of the intermediate element. In this sense, the binder preferably comprises a polymer resin.

The present invention further provides a preferential process for assembling said connecting rod/piston for alternative compressor, wherein said process comprises at least a step in which a piston, at least an intermediate element and at least a connecting rod are simultaneously fixed, wherein the intermediate element is secured inside the piston and the connecting rod is secured inside the intermediate element. Preferably, said step further comprises at least an application of binder during simultaneous fixation between the piston, intermediate element and connecting rod.

Further preferably, the binder used in the preferential process for assembling the connecting rod/assembly arrangement for alternative compressor comprises a polymer resin.

BRIEF DESCRIPTION OF DRAWINGS

The present invention will be described in more details on the basis of figures listed below, which.

DETAILED DESCRIPTION OF THE INVENTION

In accordance with the main embodiment of the present application, a connecting rod/piston arrangement for alternative compressor, more specifically for linear compressor used in cooling systems and the like, is disclosed. Said connecting rod/piston comprises at least a piston 1, at least an intermediate element 2 and at least a connecting rod 3.

In this regard, said intermediate element 2 has the function of essentially indirectly connecting an end of the connecting rod 3 to said piston 1 such that a reciprocating axial movement of the opposite end of said connecting rod 3 is directly transmitted to said piston 1.

Figure 1:
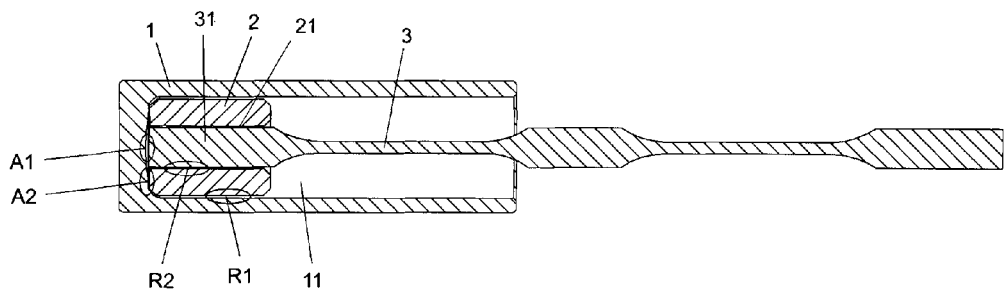
FIG. 1 illustrates a schematic cut of connecting rod/piston arrangement for alternative compressor.
Figure 2:
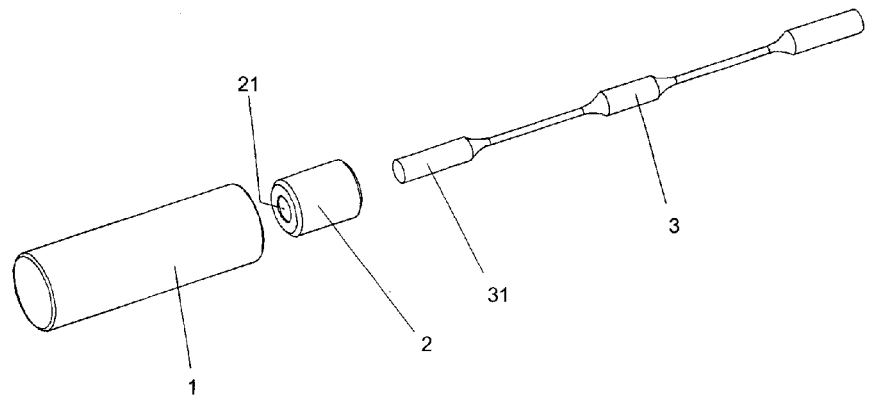
FIG. 2 illustrates a connecting rod/piston arrangement for alternative compressor in an exploded view.

FIGS. 1 and 2 (although being schematic) illustrate the preferred embodiment of the connecting rod/piston of the present invention.

By this way and in accordance with the preferred embodiment of the present invention, said piston 1 comprises a cylindrical body comprising a non-through axial channel 11, that is, an axial channel delimited by the "working end" of the piston, which is closed. The intermediate element comprises a tubular cylindrical body including, therefore, a through axial channel 21. Said connecting rod 3 comprises a rod-type having a connection end 31, which is also cylindrical.

Said intermediate element 2 is securely housed inside the non-through axial channel 11 of said piston 1, and the connection end 31 of the connecting rod 3 is securely housed inside the through axial channel 21 of the intermediate element.

Such a disposition renders the arrangement rigid, and, hence, it is ensured that reciprocating axial movement of the opposite end of the connecting rod is fully transmitted to piston 1.

Furthermore, the present connecting rod/piston arrangement allows for the mass of piston 1 to be relieved since same is hollow and does not provide for its internal volume to be fulfilled by said intermediate element 12 and connecting rod 3. Such a characteristic is extremely important concerning the frequency of functioning and vibration levels of the compressor.

To this effect, and in accordance with the preferred embodiment of the present invention, inner diameter of the non-through axial channel 11 of piston 1 is analogous to outer diameter of the intermediate element. This permits juxtaposition between said elements.

Inner diameter of the through axial channel 21 of intermediate element 2 is also analogous to outer diameter of the connection end 31 of connecting rod 2, and this also permits juxtaposition between said elements.

Optionally, the above-mentioned diameters can present a certain clearance therebetween (on the order of from 0.1 mm to 0.2 mm diametrical clearances). Such clearances are preferably fulfilled with binder.

In this context, the use of a binder disposed between the outer face of the intermediate element 2 and the inner face of the non-through axial channel 11 of said piston 1 is disclosed. It is also contemplated the use of a binder disposed between the end 31 of the connecting rod 3 and the inner face of the through axial channel 21 of the intermediate element 2.

In both cases, the binder preferably comprises a polymer resin. More specifically (but not limitative), said polymer resin preferably comprises a monocomponent epoxy resin.

In accordance with this disposition between said elements, it is observed that intermediate element 2 is securely housed at the closed end of non-through axial channel 11 of the piston 1 so that the referred to intermediate element provides radial R1 and axial A2 physical contact with the inner face of the axial channel of non-through axial channel 11 of piston 1.

In this context, it can also be noted that the connection end 31 of connecting rod 3 provides for radial physical contact R2 with the inner face of the through axial channel 21 of intermediate element 2, and axial physical contact A1 with the inner face of the non-through axial channel 11 of piston 1.

As formerly said, the present invention additionally provides a preferential process for assembling said connecting rod/piston arrangement for alternative compressor as above depicted.

Generally, said process comprises a (assembling) step where piston 1, intermediate element 2 and connecting rod 3 are simultaneously attached.

As can be noted, the intermediate element 2 is secured inside the piston 1, and the connecting rod 3 is secured inside the intermediate element 2. In this assembling step, application of a binder during simultaneous fixation between said piston 2, intermediate element 2 and connecting rod 3 is also contemplated.

After describing a preferred exemplary embodiment of the connecting rod/piston arrangement for alternative compressor, in addition to a preferential process for assembling, it should be understood that the scope of the present invention encompasses other variations, which are limited by the contents of the set of claims, including therein possible equivalents.

The invention claimed is:

1. Connecting rod/piston arrangement for alternative compressor, comprising at least a piston, at least an intermediate element and at least a connecting rod, wherein:
    said piston comprising at least a non-through axial channel;
    said intermediate element comprising at least a through axial channel;
    said connecting rod comprising at least a connection end;
    said intermediate element is securely housed inside the non-through axial channel of piston;
    said connection end of connecting rod is securely housed inside the through axial channel of intermediate element; and
    the connecting rod/piston arrangement, wherein the intermediate element has a radial physical contact (R1) and axial physical contact (A2) with an inner face of the non-through axial channel of said piston.

2. Connecting rod/piston arrangement for alternative compressor, in accordance with claim 1, wherein said non-through axial channel of piston is cylindrical.

3. Connecting rod/piston arrangement for alternative compressor, in accordance with claim 1, wherein said intermediate element is cylindrical.

4. Connecting rod/piston arrangement for alternative compressor, in accordance with claim 1, wherein an inner diameter of the non-through axial channel of piston is analogous to an outer diameter of said intermediate element.

5. Connecting rod/piston arrangement for alternative compressor, in accordance with claim 1, wherein said through axial channel of intermediate element is cylindrical.

6. Connecting rod/piston arrangement for alternative compressor, in accordance with claim 1, wherein said connection end of connecting rod is cylindrical.

7. Connecting rod/piston arrangement for alternative compressor, in accordance with claim 1, wherein an inner diameter of the through axial channel of intermediate element is analogous to an outer diameter of the connection end of connecting rod.

8. Connecting rod/piston arrangement for alternative compressor, in accordance with claim 1, wherein said intermediate element is securely housed in the closed end of the non-through axial channel of piston.

9. Connecting rod/piston arrangement for alternative compressor, in accordance with claim 1, wherein said connection end of connecting rod has a radial physical contact (R2) with the inner face of the through axial channel of intermediate element, and axial physical contact (A2) with the inner face of the non-through axial channel of piston.

10. Connecting rod/piston arrangement for alternative compressor, in accordance with claim 1, wherein it comprises a binder disposed between the outer face of the intermediate element and the inner face of the non-through axial channel of piston.

11. Connecting rod/piston arrangement for alternative compressor, in accordance with claim 1, wherein it comprises a binder disposed between said end of connecting rod and the inner face of the through axial channel of intermediate element.

12. Connecting rod/piston arrangement for alternative compressor, in accordance with claim 11, wherein said binder comprises a polymer resin.

13. Process for assembling a connecting rod/piston arrangement for alternative compressor, as defined in claim 1, wherein it comprises a step in which at least a piston, at least an intermediate element and at least a connecting rod are simultaneously attached, wherein said intermediate element is secured inside piston, and said connecting rod is secured inside intermediate element.

14. Process for assembling a connecting rod/piston arrangement for alternative compressor, in accordance with claim 13, wherein it comprises at least application of a binder during simultaneous fixation between said piston, intermediate element and connecting rod.

15. Process for assembling the connecting rod/piston arrangement for alternative compressor, in accordance with claim 14, wherein said binder comprises a polymer resin.

16. Connecting rod/piston arrangement for alternative compressor, in accordance with claim 10, wherein said binder comprises a polymer resin.

* * * * *